US011170767B2

(12) United States Patent
Kim (10) Patent No.: US 11,170,767 B2
(45) Date of Patent: Nov. 9, 2021

(54) PORTABLE DEVICE FOR CONTROLLING EXTERNAL DEVICE, AND AUDIO SIGNAL PROCESSING METHOD THEREFOR (71) Applicant: SAMSUNG ELECTRONICS CO., LTD., Suwon-si (KR)

(72) Inventor: Dong-Wan Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 16/325,938

(22) PCT Filed: Jun. 28, 2017

(86) PCT No.: PCT/KR2017/006822
§ 371 (c)(1),
(2) Date: Feb. 15, 2019

(87) PCT Pub. No.: WO2018/038381
PCT Pub. Date: Mar. 1, 2018

(65) Prior Publication Data
US 2019/0180738 A1 Jun. 13, 2019

(30) Foreign Application Priority Data
Aug. 26, 2016 (KR) .................. 10-2016-0109238

(51) Int. Cl.
G10L 15/20 (2006.01)
G10L 21/0216 (2013.01)
(Continued)

(52) U.S. Cl.
CPC ............ *G10L 15/20* (2013.01); *G10K 11/178* (2013.01); *G10L 15/22* (2013.01);
(Continued)

(58) Field of Classification Search
CPC ...................... G10L 15/20; G10L 2021/02165
See application file for complete search history.

(56) References Cited

U.S. PATENT DOCUMENTS 5,267,323 A    11/1993  Kimura
8,831,686 B2 *  9/2014  Hansson ................. H04M 1/19
                                                        455/563

(Continued)

FOREIGN PATENT DOCUMENTS

JP    2000-276191 A    10/2000
JP    2002-108391 A     4/2002

(Continued)

OTHER PUBLICATIONS

Search Report dated Oct. 16, 2017, issued by the International Searching Authority in counterpart International Patent Application No. PCT/KR2017/006822 (PCT/ISA/210).

(Continued)

Primary Examiner — Brian L Albertalli
(74) Attorney, Agent, or Firm — Sughrue Mion, PLLC (57) ABSTRACT Disclosed is a portable device for controlling an external device. The portable device comprises: a first microphone, disposed on one surface of a portable device, for receiving an audio signal including user voice uttered by a user; a second microphone, disposed on the other surface of the portable device opposite to the one surface of the portable device, for receiving the audio signal including the user voice; a signal processing unit for processing the audio signal; a communication unit for communicating with an external device; and a processor which determines the user utterance distance between the portable device and the user on the basis of the audio signal received through the first and second microphones, if it is determined that the user utterance distance is a short distance utterance, controls the signal processing unit to process only the audio signal (Continued)

received through the microphone disposed at a relatively further distance from the user from among the first and second microphones, and controls the communication unit to transmit the processed audio signal to the external device.

14 Claims, 9 Drawing Sheets (51) Int. Cl.
*G10L 21/0316* (2013.01)
*G10L 15/22* (2006.01)
*G10K 11/178* (2006.01)
*G10L 25/24* (2013.01)
*H04R 1/40* (2006.01)
*H04R 3/00* (2006.01)

(52) U.S. Cl.
CPC ...... *G10L 21/0216* (2013.01); *G10L 21/0316* (2013.01); *G10L 25/24* (2013.01); *H04R 1/406* (2013.01); *H04R 3/005* (2013.01); *G10L 2015/223* (2013.01); *G10L 2021/02166* (2013.01)

(56) References Cited

U.S. PATENT DOCUMENTS

| | | | |
|---|---|---|---|
| 9,335,912 B2 | 5/2016 | Kerr et al. | |
| 9,437,209 B2* | 9/2016 | Song | H04M 1/6008 |
| 9,601,132 B2 | 3/2017 | Son et al. | |
| 9,685,171 B1* | 6/2017 | Yang | G10L 21/0208 |
| 9,947,339 B2 | 4/2018 | Son et al. | |
| 2010/0046770 A1 | 2/2010 | Chan et al. | |
| 2011/0208521 A1* | 8/2011 | McClain | G10L 17/26 |
| | | | 704/233 |
| 2012/0045074 A1* | 2/2012 | Li | G10L 21/0208 |
| | | | 381/94.1 |
| 2012/0185246 A1* | 7/2012 | Zhang | G10L 21/0208 |
| | | | 704/226 |
| 2013/0083944 A1* | 4/2013 | Kvist | G10L 21/0216 |
| | | | 381/92 |
| 2013/0163781 A1 | 6/2013 | Thyssen et al. | |
| 2013/0332156 A1* | 12/2013 | Tackin | G10L 25/78 |
| | | | 704/226 |
| 2014/0192998 A1 | 7/2014 | Burnett | |
| 2014/0324421 A1 | 10/2014 | Kim et al. | |
| 2016/0005392 A1 | 1/2016 | Agiomyrgiannakis | |
| 2016/0275961 A1* | 9/2016 | Yu | G10L 21/0208 |

FOREIGN PATENT DOCUMENTS

| | | |
|---|---|---|
| KR | 20-0295601 Y1 | 11/2002 |
| KR | 10-2013-0022401 A | 3/2013 |
| KR | 10-2014-0028713 A | 3/2014 |
| KR | 10-1409300 B1 | 6/2014 |
| KR | 10-2014-0127508 A | 11/2014 |
| KR | 10-1540262 B1 | 7/2015 |
| KR | 10-2016-0026457 A | 3/2016 |
| WO | 2011/032096 A2 | 3/2011 |

OTHER PUBLICATIONS

Written Opinion dated Oct. 16, 2017, issued by the International Searching Authority in counterpart International Patent Application No. PCT/KR2017/006822 (PCT/ISA/237).
Communication dated Jun. 28, 2019, issued by the European Patent Office in counterpart European Application No. 17843801.6.

* cited by examiner

PORTABLE DEVICE FOR CONTROLLING EXTERNAL DEVICE, AND AUDIO SIGNAL PROCESSING METHOD THEREFOR

TECHNICAL FIELD

The disclosure relates to a portable device and an audio signal processing method therefor, and more particularly, to a portable device for controlling an external device through a user voice, and an audio signal processing method therefore.

BACKGROUND ART

In accordance with the development of an electronic technology, a technology of controlling an operation of an electronic device through a user voice has been developed and spread. As a result, users may operate various electronic devices only by uttering a voice.

In particular, recently, a voice recognition service in which a microphone is embedded in a television (TV) remote controller and an operation of a TV is controlled through the TV remote controller, has been commercialized. For such a service, a microphone carrying a voice signal of a user is essential, and an effective voice processing system is required for smooth voice recognition.

In an initial stage of the commercialization, in general, a scenario that a user puts a remote controller to the mouth of the user and utters a voice was assumed, and only one microphone was embedded in the remote controller. This is because a complicated voice processing is not required at the time of short distance utterance of the user as described above.

Recently, a remote controller in which two microphones are embedded has been developed in consideration of user utterance in a general state in which the user grips the remote controller (for example, a state in which there is a distance between the remote controller and the mouth of the user, the remote controller being pointed at the TV for channel zapping). In this case, an ambient noise of which an amount is larger than that of the short distance utterance described above is introduced through the microphone. Therefore, signal processing such as canceling of the ambient noise from an audio signal input through the microphone is required in order to smooth voice recognition.

In this case, when noise canceling processing is performed in a fixed manner without considering an utterance distance of the user, a phenomenon that a voice of the user is rather distorted may occur in some cases, which inhibits smooth voice recognition.

DISCLOSURE

Technical Problem

The disclosure has been made in order to solve the above-described problems and an object of the disclosure is to provide a portable device flexibly processing an audio signal depending on a user utterance distance and an audio signal processing method therefor.

Technical Solution

According to an embodiment of the disclosure, a portable device for controlling an external device includes: a first microphone configured to be disposed in one surface of the portable device and receive an audio signal including a user voice uttered by a user; a second microphone configured to be disposed on the other surface opposing the one surface of the portable device and receive an audio signal including the user voice; a signal processing unit configured to process the audio signals; a communication unit configured to communicate with the external device; and a processor configured to determine a user utterance distance between the portable device and the user based on the audio signals received through the first and second microphones, control the signal processing unit to process only the audio signal received through any one of the first and second microphones disposed relatively further away from the user than the other when it is determined that the user utterance distance is a short distance utterance, and control the communication unit to transmit the processed audio signal to the external device.

The signal processing unit may perform at least one signal processing of noise canceling or amplitude correction for the audio signals received through the first and second microphones.

The processor may control the signal processing unit to perform only the amplitude correction for the audio signal received though the microphone disposed relatively further away from the other when it is determined that the user utterance distance is the short distance utterance.

The processor may control the signal processing unit to perform the noise canceling and the amplitude correction for the audio signals received though the first and second microphones when it is determined that the user utterance distance is not the short distance utterance, and control the communication unit to transmit the processed audio signals to the external device.

The processor may determine the user utterance distance based on whether a breathing sound of the user is detected from the audio signals received through the first and second microphones.

The processor may compare a mel-frequency cepstral coefficient (MFCC) property of the audio signals received through the first and second microphones and an MFCC property of a preset breathing sound template with each other and determine that the user utterance distance is the short distance utterance when similarity between the MFCC properties is a preset threshold value or more.

The processor may determine that the user utterance distance is the short distance utterance when an amplitude of each of the audio signals received through the first and second microphones is a preset threshold value or more.

the processor may determine that the user utterance distance is the short distance utterance when a difference between an amplitude of the audio signal received through the first microphone and an amplitude of the audio signal received through the second microphone is a preset threshold value or more.

According to another embodiment of the disclosure, an audio signal processing method for a portable device for controlling an external device includes: receiving audio signals including a user voice uttered by a user through a first microphone disposed in one surface of the portable device and a second microphone disposed on the other surface opposing the one surface of the portable device; determining a user utterance distance between the potable device and the user; processing the received audio signals; and transmitting the processed audio signals to the external device, wherein in the processing of the audio signals, when it is determined that the user utterance distance is the short distance utterance, only the audio signal received through any one of the first and second microphones disposed relatively further away from the user is processed.

In the processing of the audio signals, at least one signal processing of noise canceling or amplitude correction for the audio signals received through the first and second microphones may be performed.

In the processing of the audio signals, only the amplitude correction may be performed for the audio signal received though the microphone disposed relatively further away from the other when it is determined that the user utterance distance is the short distance utterance.

In the processing of the audio signals, the noise canceling and the amplitude correction may be performed for the audio signals received though the first and second microphones when it is determined that the user utterance distance is not the short distance utterance.

The determining may include: detecting a breathing sound of the user from the audio signals received through the first and second microphones; and determining the user utterance distance depending on whether the breathing sound is detected.

The detecting of the breathing sound may include comparing an MFCC property of the audio signals received through the first and second microphones and an MFCC property of a preset breathing sound template with each other to determine similarity between the MFCC properties, and the determining of the user utterance distance may include determining that the user utterance distance is the short distance utterance when the similarity is a preset threshold value or more.

In the determining, it may be determined that the user utterance distance is the short distance utterance when an amplitude of each of the audio signals received through the first and second microphones is a preset threshold value or more.

The determining may include comparing the amplitude of the audio signal received through the first microphone and the amplitude of the audio signal received through the second microphone and determining that the user utterance distance is the short distance utterance when a difference between the amplitudes of the audio signals is a preset threshold value or more.

Advantageous Effects

According to the various embodiments of the disclosure as described above, the portable device for controlling an external device may flexibly process an audio signal depending on an utterance distance of a user. Accordingly, the external device may perform smooth voice recognition regardless of the utterance distance of the user.

BEST MODE

When it is decided that a detailed description for the known art related to the disclosure may unnecessarily obscure the gist of the disclosure, it will be omitted. In addition, terms "-er (or -or)" for components used in the following description are used only to easily make the disclosure. Therefore, these terms do not have meanings or roles that distinguish from each other in themselves.

Terms including ordinal numbers such as 'first', 'second', and the like, may be used to describe various components. However, these components are not limited by these terms. Terms may be used in order to distinguish one component from another component. For example, a first component may be named a second component without departing from the scope of the disclosure. Further, the second component may also be named the first component.

Terms used in the specification are used to describe embodiments, and are not intended to restrict and/or limit the disclosure. Singular forms are intended to include plural forms unless the context clearly indicates otherwise.

It will be understood that terms 'include' or 'have' used in the specification, specify the presence of features, numerals, steps, operations, components, parts mentioned in the specification, or a combination thereof, but do not preclude the presence or addition of one or more other features, numerals, steps, operations, components, parts, or a combination thereof.

Figure 1A:
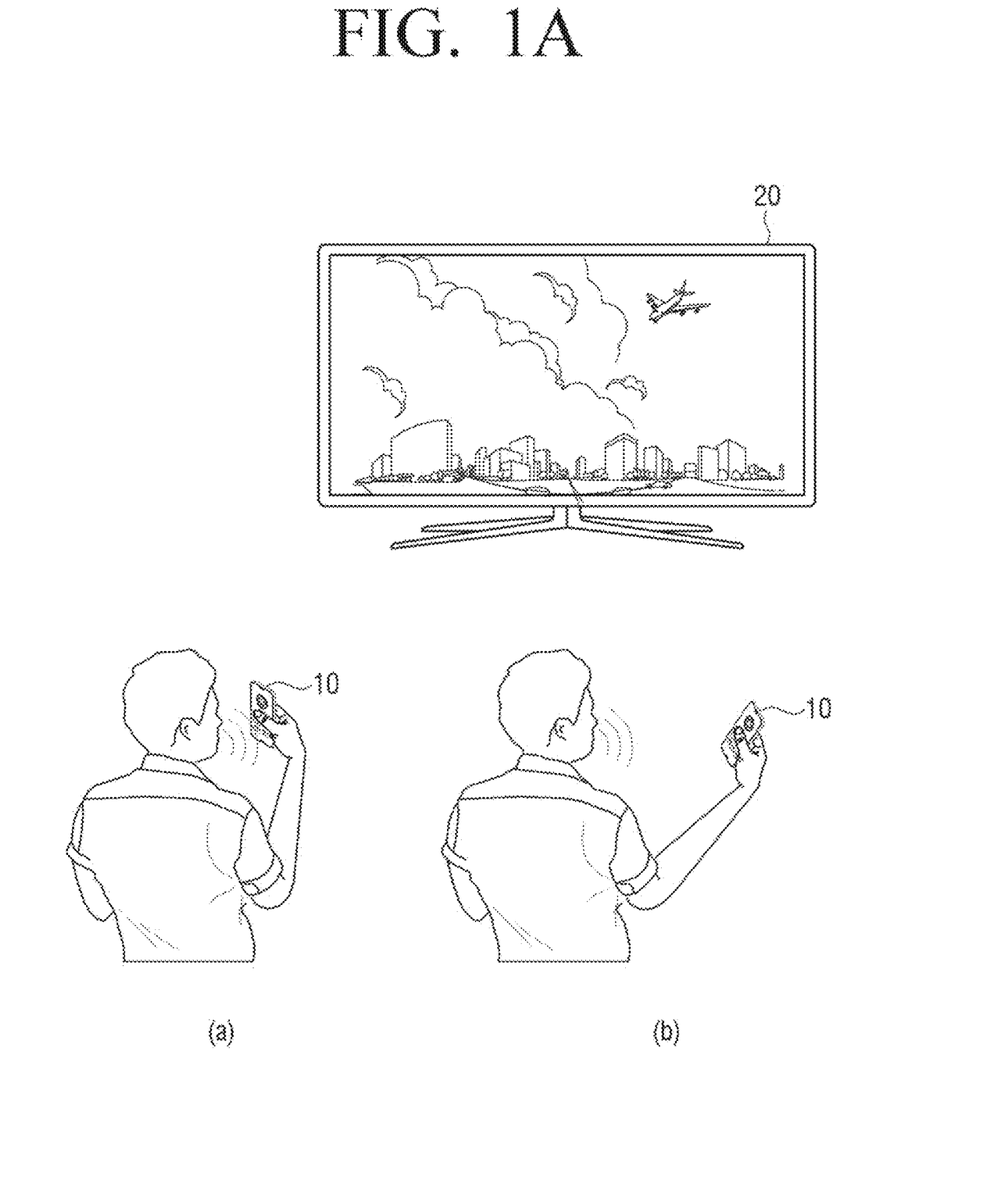
FIG. 1 is a view for describing an example of a system controlling an external device through a portable device, and problems of the related art.

Hereinafter, various embodiments of the disclosure will be described in detail with reference to the accompanying drawings. FIG. 1A illustrates an example of a system controlling an external device through a portable device. In the example of FIG. 1A, a user may control a television (TV) 20 through a remote controller 10. In particular, the user may control the TV 20 by uttering a user command for controlling the TV 20 through the remote controller 10.

In detail, when the user utters the user command for controlling the TV 20, the remote controller 10 may receive an audio signal including a voice corresponding to the user command, perform a necessary processing, and then transmit the received audio signal to the TV 20.

When the audio signal is received from the remote controller 10, the TV 20 may recognize the user command included in the received audio signal and perform a user operation corresponding to the recognized user command.

As described above, a microphone needs to be provided in the remote controller 10 in order to control the TV 20 by receiving a user voice through the remote controller 10.

Figure 1B:
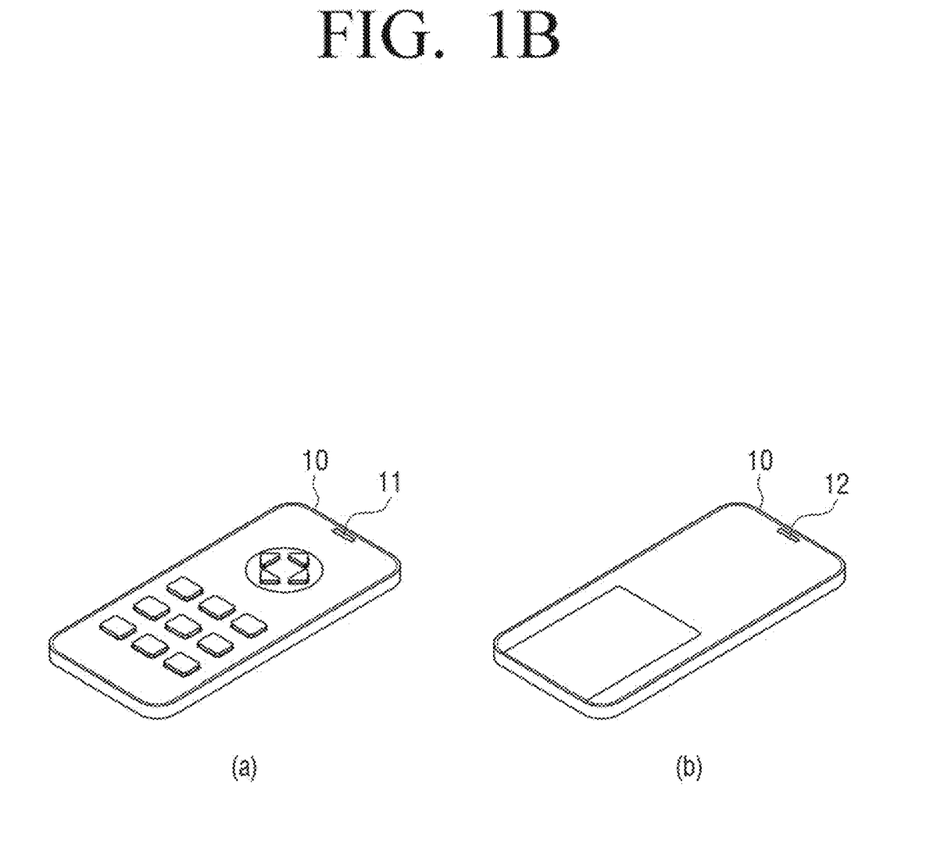

FIG. 1B is a diagram illustrating the remote controller 10 of FIG. 1A in more detail. In FIG. 1B, (a) shows a front surface of the remote controller 10, and (b) shows a back surface of the remote controller 10. As illustrated in FIG. 1B, the remote controller 10 may include microphones 11 and 12 at the front and back surfaces, respectively, in order to obtain an audio signal including a voice of the user.

As such, when two microphones 11 and 12 are included in the remote controller 10, the TV 20 may be controlled through the user voice not only in case that the user utters a voice while putting the remote controller 10 to the mouth of the user as illustrated in (a) of FIG. 1A (hereinafter, referred to as "short distance utterance"), but also in case that the user utterance is not the short distance utterance as illustrated in (b) of FIG. 1A.

In detail, when the user utterance is not the short distance utterance as illustrated in (b) of FIG. 1A, various noises are introduced through the microphones 11 and 12 together with the voice of the user. Therefore, processing such as noise canceling or the like is essential for accurate user voice recognition. In this case, the remote controller 10 may cancel the noises by performing signal processing such as beamforming or the like for audio signals input while having a phase difference corresponding to a distance between the two microphones 11 and 12 and transmitting the processed signal to the TV 20.

As such, in the case of the remote controller 10 including two microphones 11 and 12, although the voice recognition is possible by canceling the noise even when the user utterance is not the short distance utterance, a phenomenon that the voice of the user is rather distorted in some cases may occur when noise canceling processing is performed in a fixed manner without considering the utterance distance of the user.

Figure 1C:
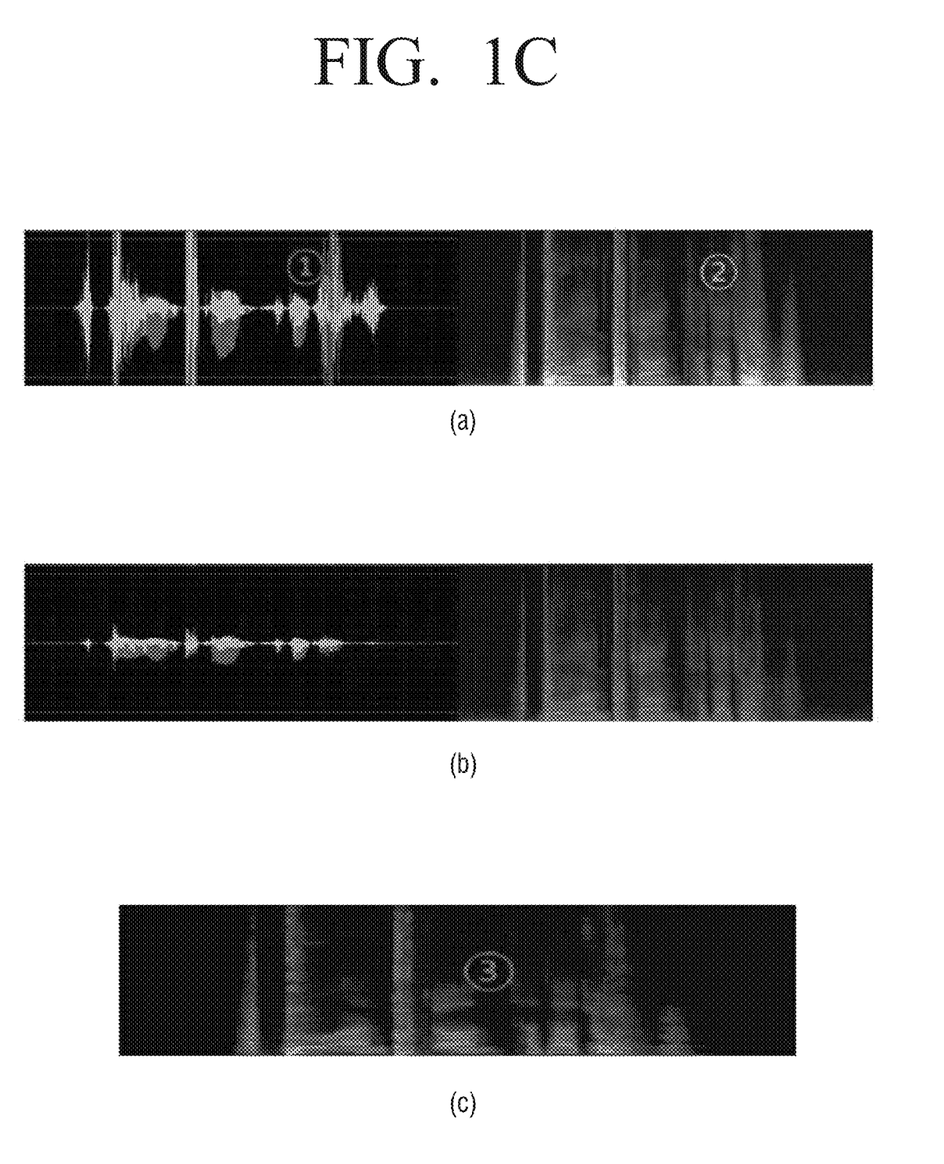

FIG. 1c is a view for describing the problem above. In FIG. 1C, (a) and (b) show a signal of the microphone 11 of the front surface and a signal of the microphone 12 of the back surface in case that the user utterance is the short distance utterance, respectively. Specifically, in (a) and (b) of FIG. 1C, a left side view illustrates a microphone signal waveform in a time domain, and a right side view illustrates a spectrum in a frequency domain.

When the user utterance is the short distance utterance, as illustrated in (a) of FIG. 1C, a distance between the microphone 11 of the front surface and a sound source (the mouth of the user) is very short and it is likely that a breathing sound of the user is introduced. Therefore, the signal is saturated or the like, that is, the distortion of the signal can be seen a and ⓪ of FIG. 1C). In contrast, in the case of the signal of the microphone 12 of the back surface, it can be seen that there is no introduction of the breathing sound and the distortion of the signal as illustrated in (a) of FIG. 1C.

In this case, when the noise canceling processing is performed in a fixed manner without considering the utterance distance of the user, that is, when the noise canceling processing is performed identically to case that the user utterance is not the short distance utterance even in case that the user utterance is the short distance utterance, it can be seen that the signal of the microphone of the back surface without distortion is rather distorted like the spectrum signal illustrated in (c) of FIG. 1C (③ of FIG. 1C).

Accordingly, in the portable device for controlling an external device through the voice of the user, the necessity for a technology of flexibly processing the audio signal in consideration of the user utterance distance increases.

Figure 2:
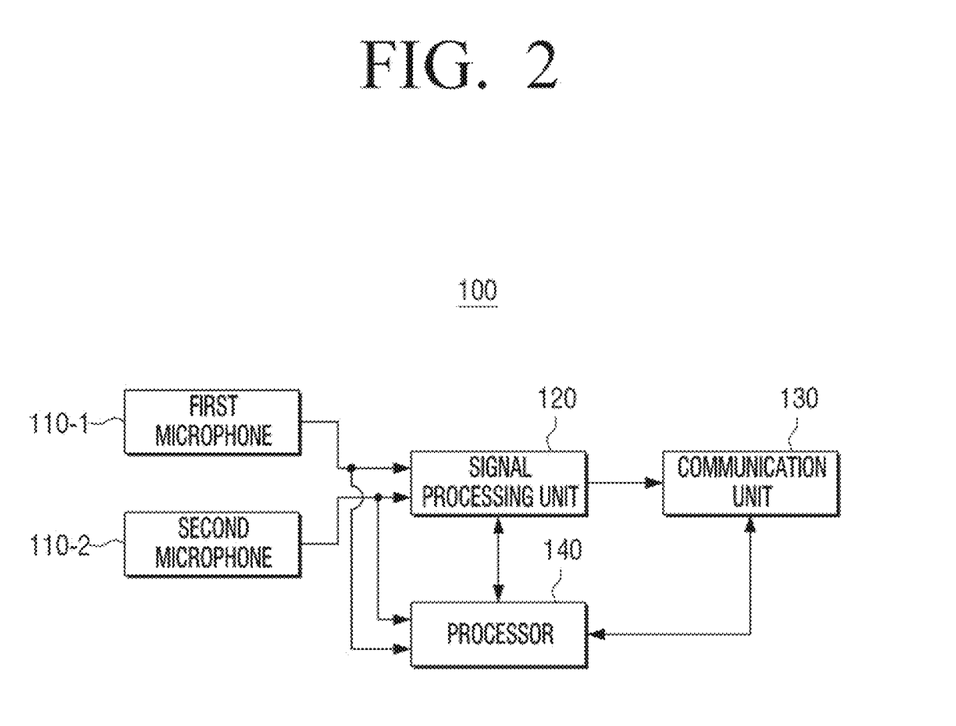
FIG. 2 is a block diagram illustrating a configuration of a portable device according to an embodiment of the disclosure.

FIG. 2 is a block diagram illustrating a configuration of a portable device for controlling an external device according to an embodiment of the disclosure.

Here, a portable device 100 is various devices capable of controlling an external device, and may be any electronic device capable of controlling an external device 20 by receiving the voice of the user and transmitting the received voice to the external device 20 in the system as illustrated in FIG. 1A. In particular, the portable device 100 may be a device that the user may grip, such as a remote controller, a smartphone, a personal digital assistant (PDA), or the like including two or more microphones, but is not limited thereto.

Further, the external device 20 is various devices performing an operation according to a control of the portable device 100, and may be the TV 20 controlled by the remote controller 10 as in the example of FIG. 1A. However, the external device 20 is not limited thereto and may be any electronic device capable of recognizing a user voice from an audio signal received through the various portable devices 100 described above and executing a user command corresponding to the recognized user voice. For example, the external device 20 may be a set-top box, a sound bar, an electronic frame, an electronic board, an electronic table, a large format display (LFD), a desktop personal computer (PC), a laptop computer, various smart appliances, and the like.

As illustrated in FIG. 2, the portable device 100 for controlling the external device 20 includes a first microphone 110-1, a second microphone 110-2, a signal processing unit (or a signal processor) 120, a communication unit (or a communicator) 130, and a processor 140.

The first microphone 110-1 and the second microphone 110-2 convert an external sound into an electric signal and output the converted electric signal. Particularly, the first microphone 110-1 and the second microphone 110-2 may receive audio signals including a user voice uttered by the user and convert each of the audio signals into an electric signal, thereby providing the electric signal to the signal processing unit 120 and the processor 140.

In this case, the first microphone 110-1 may be disposed in one surface of the portable device 100 and the second microphone 110-2 may be disposed in the other surface opposite to the surface in which the first microphone 110-1 is disposed.

The signal processing unit 120 processes the audio signals provided from the first microphone 110-1 and the second microphone 110-2. In detail, the signal processing unit 120 may be controlled by the processor 140 to perform at least one processing of noise canceling processing in which a noise except for the user voice is canceled from the audio signals provided from the first and second microphones 110-1 and 110-2 and amplitude correction processing in which an amplitude of each of the audio signals is corrected.

Here, the noise canceling processing may include beamforming processing in which a voice introduced through the microphone from a direction deviating from a user direction at a predetermined angle or non-voice canceling processing in which a voice and a non-voice in a sound introduced through the microphone are distinguished from each other and the non-voice is cancelled as described below with reference to FIG. 3.

To this end, the signal processing unit 120 may be implemented by hardware such as application specific integrated circuits (ASICs), digital signal processing units (DSPs), digital signal processing devices (DSPDs), programmable logic devices (PLDs), and the like, but is not limited thereto.

The communication unit 130 performs communication with the external device 20. In particular, the communication unit 130 may be controlled by the processor 140 to transmit, to the external device 20, the audio signal processed by the signal processing unit 120.

Therefore, the external device 20 may receive the audio signal transmitted from the portable device 100 and recognize the user voice, and may perform a control operation corresponding to the recognized user voice.

For example, the communication unit 130 may include a short range communication module or a wireless local area network (LAN) communication module. Here, the short range communication module is a communication module performing data communication wirelessly with the external device 20 located at a short distance, and for example, may be a Bluetooth module, a ZigBee module, a near field communications (NFC) module, and an infrared (IR) transmission/reception module, and the like. Further, the wireless LAN communication module is a module connected to an external network depending on a wireless communication protocol such as WiFi, IEEE, or the like, to perform communication. In addition, the communication unit 130 may further include a mobile communication module accessing a mobile communication network according to various mobile communication protocols such as $3^{rd}$ generation (3G), 3rd generation partnership project (3GPP), long term evolution (LTE), and the like, to perform communication.

The processor 140 controls a general operation of the portable device 100.

In particular, the processor 140 may determine a user utterance distance based on the audio signals received through the first and second microphones 110-1 and 110-2. Here, the user utterance distance means a distance between the portable device 100 and the user.

According to an embodiment of the disclosure, the processor 140 may determine a user utterance distance based on whether the breathing sound of the user is detected from the audio signals received through the first and second microphones 110-1 and 110-2.

In detail, the processor 140 compares a mel-frequency cepstral coefficient (MFCC) property of the audio signals received through the first and second microphones 110-1 and 110-2 and an MFCC property of a preset breathing sound template with each other and when similarity between the MFCC properties is a preset threshold value or more, the processor 140 may determine that the user utterance distance is the short distance utterance. In this case, the preset breathing sound template may be stored in a storage (not illustrated) of the portable device 100.

For example, the processor 140 extracts the MFCC property in each frame of the audio signals received through the first and second microphones 110-1 and 110-2 and compares the extracted MFCC property and the MFCC property of the preset breathing sound template with each other to obtain similarity, and when the similarity between the MFCC properties is the preset threshold value or more, the processor 140 may increase a count value.

Therefore, the processor 140 may determine that a corresponding frame is a frame including the breathing sound when the count value is larger than a reference value, and may determine that the user utterance is the short distance utterance when the number of frames determined as including the breathing sound exceeds a reference value.

According to another embodiment of the disclosure, the processor 140 may determine the user utterance distance based on whether the audio signals received through the first and second microphones 110-1 and 110-2 are saturated.

In detail, the processor 140 may determine that the user utterance distance is the short distance utterance when the amplitude of each of the audio signals received through the first and second microphones 110-1 and 110-2 is a preset threshold value or more.

For example, the processor 140 obtains amplitudes of a plurality of sample data in each frame of the audio signals received through the first and second microphones 110-1 and 110-2, determines whether the amplitude of each sample data exceeds a reference value, and when the amplitude of each sample data exceeds the reference value, the processor 140 may increase a count value.

Therefore, the processor 140 may determine that a corresponding frame is a saturated frame when the count value is larger than a reference value, and may determine that the user utterance is the short distance utterance when the number of saturated frames exceeds a reference value.

According to still another embodiment of the disclosure, the processor 140 may determine the user utterance distance based on a difference between the amplitudes of the audio signals received through the first and second microphones 110-1 and 110-2.

In detail, the processor 140 may determine that the user utterance distance is the short distance utterance when the difference between the amplitude of the audio signal received through the first microphone 110-1 and the amplitude of the audio signal received through the second microphone 110-2 is the preset threshold value or more.

For example, the processor 140 may obtain the amplitude of the sample data in each frame of the audio signals received through the first and second microphones 110-1 and 110-2, and then compare the amplitude of the audio signal received through the first microphone 110-1 and the amplitude of the audio signal received through the second microphone 110-2.

The first microphone 110-1 and the second microphone 110-2 are disposed in opposite surfaces (for example, the front surface and the back surface) of the portable device 100, respectively. Therefore, in case of the short distance utterance of the user, the difference between the amplitudes of the audio signals received through the first and second microphones 110-1 and 110-2 is clear as described above.

Therefore, the processor 140 may determine that a corresponding frame is a short distance utterance frame when a difference between amplitudes of the respective sample data of the audio signals received through the first and second microphones 110-1 and 110-2 is a reference value or more, and determine that the user utterance distance is the short distance utterance when the number of short distance utterance frames is a reference value or more.

In addition, it goes without saying that the processor 140 may determine the user utterance distance by combining the above described embodiments.

As described above, when the user utterance distance is determined, the processor 140 may control the signal processing unit 120 to process the audio signal depending on the determined user utterance distance.

In detail, when it is determined that the user utterance distance is the short distance utterance, the processor 140 may control the signal processing unit 120 to process only an audio signal received through one of the first and second microphones 110-1 and 110-2 disposed relatively further away from the user than the other.

The processor 140 may determine a microphone relatively further away from the user among the first and second microphones 110-1 and 110-2. For example, the voice of the user is input through the respective microphones while having a phase difference corresponding to a distance between the first microphone 110-1 and the second microphone 110-2 disposed in the portable device 100. The processor 140 may determine which microphone is disposed relatively further away from the user (exactly, the mouth of the user) based on the phase difference of the audio signals input through the respective microphones 110-1 and 110-2. However, the disclosure is not limited thereto. The processor 140 may determine the microphone disposed relatively further away from the user based on comparison between the amplitudes of the audio signals input through the first and second microphones 110-1 and 110-2, whether each microphone signal is saturated, or comparison between the MFCC properties.

In detail, the processor 140 may control the signal processing unit 120 to perform only the amplitude correction for the audio signal received through one of the first and second microphones 110-1 and 110-2 disposed relatively further away from the user than the other.

Meanwhile, when it is determined that the user utterance distance is not the short distance utterance, the processor 140 may control the signal processing unit 120 to perform both of the noise canceling and the amplitude correction for the respective audio signals received through the first and second microphones 110-1 and 110-2.

The processor 140 may control the communication unit 130 to transmit the audio signals processed as described above to the external device 20.

That is, for example, when it is determined that the user utterance is the short distance utterance and the second microphone 110-2 is disposed relatively further away from the user, the processor 140 may control the signal processing unit 120 to perform only the amplitude correction for the audio signal received through the second microphone 110-2. In this case, the audio signal received through the first microphone 110-1 is blocked or discarded and not used. Therefore, in this case, only the amplitude of the audio signal received through the second microphone 110-2 is corrected and transmitted to the external device 20 through the communication unit 130.

When it is determined that the user utterance is not the short distance utterance, the processor 140 controls the signal processing unit 120 to perform the noise canceling and the amplitude correction for the respective audio signals received through the first and second microphones 110-1 and 110-2, all of the respective processed audio signals are transmitted to the external device 20 through the communication unit 130.

As described above, the audio signal is flexibly processed depending on the user utterance distance in the voice recognition system controlling the external device 20 through the portable device 10 including two microphones, such that it is possible to prevent a voice distortion phenomenon that may occur in case of the short distance utterance of the user when performing the noise canceling processing in a fixed manner according to the related art. Accordingly, smooth voice recognition is possible regardless of whether the user utterance is the short distance utterance.

The example in which the user utterance distance is determined by using the audio signals received through the first and second microphones 110-1 and 110-2 has been described above, however, the example of the determination of the user utterance distance is not limited thereto. For example, the portable device 100 may include a separate sensor such as a temperature sensor, a humidity sensor, a vibration sensor, a motion sensor, an IR sensor, an image sensor, and the like, and determine the user utterance distance by using information obtained through the various sensors described above.

Hereinafter, a signal processing process according to an embodiment of the disclosure will be described in more detail with reference to FIG. 3. In FIG. 3, for convenience of explanation, description will be provided under an assumption that the first microphone 110-1 is a front surface microphone disposed in the front surface of the portable device 100 and the second microphone 110-2 is a back surface microphone disposed in the back surface of the portable device 100.

As described above, when it is determined that the user utterance is not the short distance utterance, the signal processing unit 120 may be controlled by the processor 140 to perform the noise canceling processing and the amplitude correction for the audio signals received through the front microphone 110-1 and the back microphone 110-2. To this end, the signal processing unit 120 may include a noise canceller 121 and an amplitude corrector 122, as illustrated in FIG. 3.

The noise canceller 121 is a component for removing a noise except for the user voice and may include a beamformer 121-1 and a non-voice canceller 121-2.

The beamformer 121-1 may perform beamforming by using stereo audio signals input through the front surface microphone 110-1 and the back surface microphone 110-2.

Generally, the user utters a voice toward the front surface of the portable device 100 in a state of gripping the portable device 100 to control the external device 20 through the voice. Therefore, a phase difference exists between audio signals corresponding to the user voice input through the front surface microphone 110-1 and the back surface microphone 110-2, respectively. In contrast, a phase difference almost does not exist between audio signals input through the front surface microphones 110-1 and the back surface microphones 110-2 from a side surface direction of the portable device 100.

The beamformer 121-1 may process the rest audio signal except for the audio signal in the user direction as a noise and cancel the rest audio signal by using the phase difference as described above, thereby performing beamforming in the user direction. Therefore, the audio signal corresponding to the noise input through the microphones 110-1 and 110-2 from the side surface direction may be weakened or canceled.

Meanwhile, as described above, the beamformer 121-1 may cancel or attenuate a side surface signal by performing the beamforming as described above, convert stereo signals into a mono signal, and provide the converted mono signal to the non-voice canceller 121.

The non-voice canceller 121-2 may cancel a non-voice signal which is not the user voice from the audio signals input through the microphones 110-1 and 110-2. For example, the non-voice canceller 121-2 may cancel the non-voice signal from the audio signals beamformed by the beamformer 121-1, by using a voice/non-voice distinguishing module. More detailed description for the voice/non-voice module and the canceling of the non-voice using the voice/non-voice module departs from the gist of the disclosure and thus will be omitted.

Figure 3:
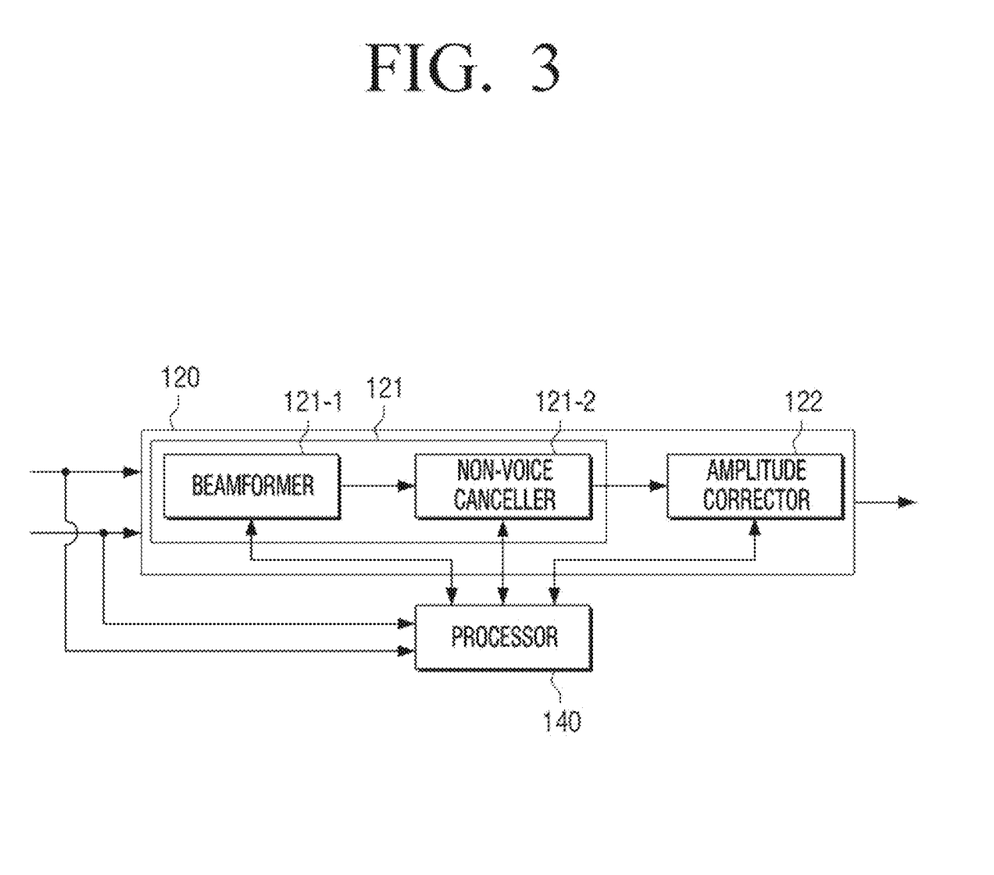
FIG. 3 is a block diagram illustrating a configuration of a signal processing unit according to an embodiment of the disclosure in detail.

Meanwhile, the example in which the non-voice canceling processing is performed for the audio signal obtained after the beamforming processing is illustrated in FIG. 3. However, the beamforming processing may also be performed after canceling the non-voice first in some embodiments.

The amplitude corrector 122 corrects amplitudes of the audio signals received through the microphones 110-1 and 110-2. In detail, the amplitude corrector 122 may correct the amplitude of the audio signal to be suitable for user voice recognition by the external device 20.

For example, the amplitude corrector 122 may attenuate a signal of which an amplitude is large and amplify a signal of which an amplitude is small. In this case, the amplitude corrector 122 may correct the amplitude of the signal by applying a preset gain curve to an audio signal from which a noise is canceled through the noise canceller 121, but is not limited thereto.

As such, when the user utterance is not the short distance utterance, the processor 140 may control the signal processing unit 120 to perform the noise canceling and the amplitude correction for the audio signals received through the front surface microphone 110-1 and the back surface microphone 110-2, and control the communication unit 130 to transmit the audio signals obtained after the noise canceling and the amplitude correction processing to the external device 20.

Meanwhile, when the user utters a voice while putting the front surface of the portable device 100 to the mouth of the user, that is, when the user utterance is the short distance utterance, the processor 140 may control the signal processing unit 120 to process only the audio signal received through the back surface microphone 110-2 disposed relatively further away from the mouth of the user. In this case, the audio signal received through the front surface microphone 110-1 is not transferred to the signal processing unit 120. In detail, the processor 140 controls the signal processing unit 120 to perform only the amplitude correction for the signal received through the back surface microphone 110-2 without performing the noise canceling processing such as the beamforming or the non-voice canceling.

As described above with reference to FIG. 1C, at the time of the short distance utterance of the user, in case of the audio signal received through the front surface microphone 110-1, the breathing sound is introduced or the signal is saturated and thus distortion occurs. Therefore, in various embodiments of the disclosure, only the audio signal received through the back surface microphone 110-2 without distortion is used.

Further, when the noise canceling processing, which is performed when the user utterance is not the short distance utterance, is performed for the signal received through the back surface microphone 110-2 without distortion at the time of the short distance utterance of the user, the signal is rather distorted. Therefore, the problems of the related art may be resolved by performing only the amplitude correction processing without performing the noise canceling processing.

Figure 4:
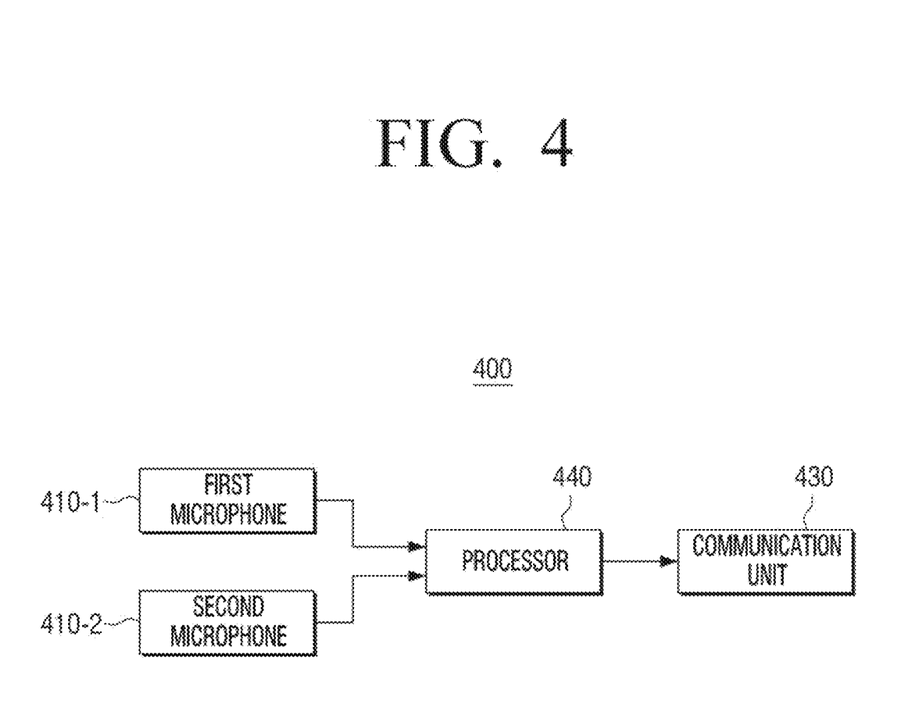
FIG. 4 is a block diagram illustrating a configuration of a portable device according to another embodiment of the disclosure.

FIG. 4 is a block diagram illustrating a configuration of a portable device according to another embodiment of the disclosure. As illustrated in FIG. 4, a portable device 400 may include a first microphone 410-1, a second microphone 410-2, a communication unit 430, and a processor 440. The first and second microphones 410-1 and 410-2 and the communication unit 430 of the portable device 400 are the same components as the first and second microphones 110-1 and 110-2 and the communication unit 130 of the portable device 100 described above with reference to FIG. 2, therefore, overlapped description thereof will be omitted.

Meanwhile, it can be seen that the portable device 400 does not include the signal processing unit 120 unlike the portable device 100 illustrated in FIG. 2. A technical idea of the disclosure may be applied as described below through the portable device 400 having the configuration as described above.

A configuration of the signal processing unit 120 may also be implemented by software according to an embodiment of the disclosure. That is, the functions of the beamformer 121-1, the non-voice canceller 121-2, and the amplitude corrector 122 described with reference to FIG. 3 may be implemented by program codes such as a beamforming module, a non-voice canceling module, and an amplitude correcting module and stored in the storage (not illustrated), and the processor 440 may perform the operation of the signal processing unit described above by executing the modules stored in the storage (not illustrated).

Meanwhile, the configuration of the signal processing unit 120 may also be implemented in the external device 20 according to another embodiment of the disclosure.

In this case, the processor 440 may determine a user utterance distance between the portable device 400 and the user based on audio signals received through the first and second microphones 410-1 and 410-2, and control the communication unit 430 to transmit, to the external device 20, only an audio signal received through one of the first and second microphones 410-1 and 420-2 disposed relatively further away from the user when it is determined that the user utterance distance is the short distance utterance.

Therefore, the external device 20 may perform only the amplitude correction for the audio signal transmitted from the portable device 400 and recognize user voice by analyzing the audio signal obtained after the amplitude correction.

Further, when it is determined that the user utterance distance is not the short distance utterance, the processor 440 may control the communication unit 430 to transmit, to the external device 20, all of the audio signals received through the first and second microphones 410-1 and 110-2.

Therefore, the external device 20 may perform the noise canceling processing and the amplitude correction for the stereo audio signals received from the portable device 400 and recognize the user voice by analyzing the processed audio signals.

Meanwhile, the example in which the user voice recognition itself is performed in the external device 20 has been described with reference to FIGS. 2 to 4. This is because it is preferable that a voice recognition engine is provided in the external device 20 rather than the portable device 100 or 400 due to a large size thereof.

However, the disclosure is not limited thereto, and the portable device 100 or 400 may include the voice recognition engine (or voice recognition module) in some embodiments. In this case, the portable device 100 or 400 may directly recognize the user voice by analyzing the audio signal obtained after the noise canceling or the amplitude correction processing through the signal processing unit 120, and directly transmit, to the external device 20, a control signal corresponding to the recognized user voice.

Figure 5:
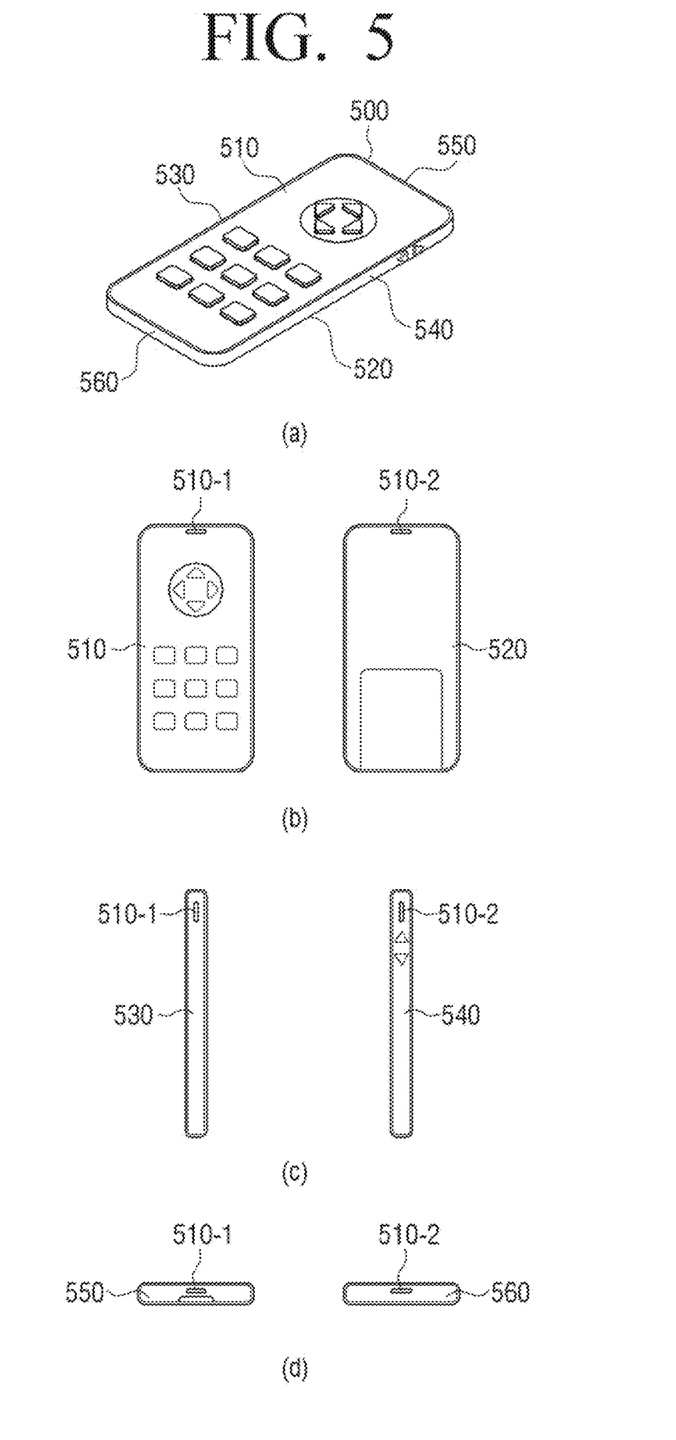
FIG. 5 is a view illustrating a layout of a first microphone and a second microphone according to various embodiments of the disclosure.

FIG. 5 is a view illustrating a layout of a first microphone and a second microphone according to various embodiments of the disclosure. FIG. 5 illustrates a case that the portable device 100 or 400 is a remote controller 500, and the remote controller 500 has six surfaces such as a front surface 510, a back surface 520, a left-side surface 530, a right-side surface 540, an upper surface 550, and a lower surface 560.

When the user utters a voice while gripping the remote controller 500, two microphones are required to perform noise canceling processing such as beamforming for audio signals input through the microphones in a user direction, and in this case, the audio signals obtained through the respective microphones need to have a phase difference therebetween.

To this end, it may be preferable that the remote controller 500 includes microphones 510-1 and 510-2 in the front surface 510 and the back surface 520 opposite to the front surface as illustrated in (b) of FIG. 5. Meanwhile, positions where the microphones are disposed are not limited to upper sides of the front and back surfaces 510 and 520 as illustrated in (b) of FIG. 5. For example, the microphones may also be disposed in other regions of the front and back surfaces 510 and 520, such as lower sides or central portions of the front and back surfaces 510 and 520, so that the microphones are opposite to each other.

Meanwhile, in some embodiments, the microphones 510-1 and 510-2 may be disposed at the left-side surface 530 and the right-side surface 540 opposite to the left-side surface 530, respectively, or may disposed at the upper surface 550 and the lower surface 560 opposite to the upper surface 550, respectively, as illustrated in (c) or (d) of FIG. 5.

Figure 6:
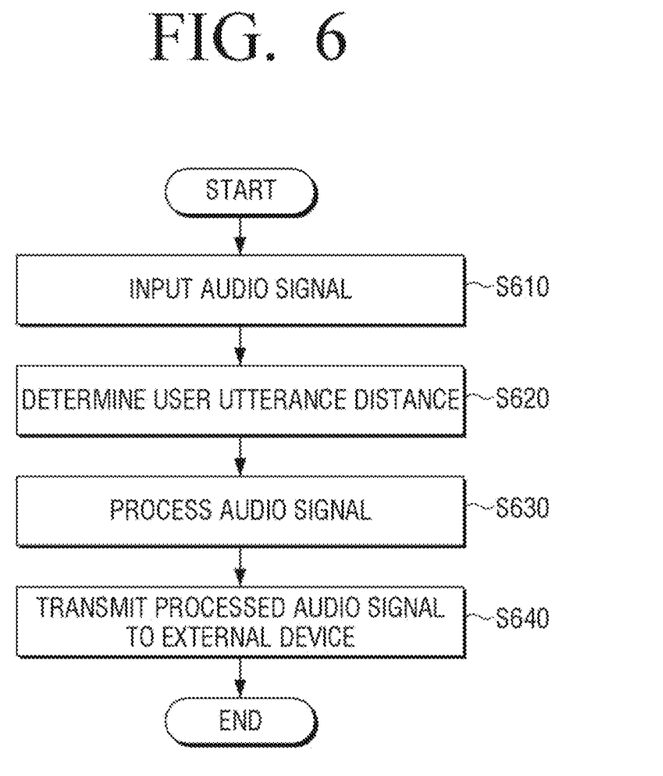
FIG. 6 is a flow chart illustrating an audio signal processing method for a portable device according to an embodiment of the disclosure.

FIG. 6 is a flow chart illustrating an audio signal processing method for a portable device according to an embodiment of the disclosure. Referring to FIG. 6, the portable device 100 or 400 for controlling an external device receives audio signals including a user voice uttered by the user through the first microphone disposed in one surface of the portable device 100 or 400, and the second microphone disposed in the other surface opposite to one surface of the portable device 100 or 400 (S610).

Therefore, the portable device 100 or 400 may determine a user utterance distance. Here, the portable device 100 or 400 may determine the user utterance distance based on the audio signals received through the first and second microphones.

For example, the portable device 100 or 400 may detect a breathing sound of the user from the audio signals received through the first and second microphones and determine the user utterance distance depending on whether the breathing sound is detected. In detail, the portable device 100 or 400 compares an MFCC property of the audio signals received through the first and second microphones and an MFCC property of a preset breathing sound template with each other and when determined similarity between the MFCC properties is a preset threshold value or more, the portable device 100 or 400 may determine that the user utterance distance is the short distance utterance.

In addition, the portable device 100 or 400 may determine that the user utterance distance is the short distance utterance when the amplitude of each of the audio signals received through the first and second microphones is a preset threshold value or more.

Further, the portable device 100 or 400 may compare the amplitude of the audio signal received through the first microphone and the amplitude of the audio signal received through the second microphone with each other, and determine that the user utterance distance is the short distance utterance when a difference between the amplitudes of the audio signals is a preset threshold value or more.

As such, when the user utterance distance is determined, the portable device 100 or 400 processes the audio signals received through the first and second microphones (S630).

In detail, the portable device 100 or 400 may process only an audio signal received through one of the first and second microphones disposed relatively further away from the user than the other when it is determined that the user utterance distance is the short distance utterance, and the portable device 100 or 400 may process all of the audio signals received through the first and second microphones when it is determined that the user utterance distance is not the short distance utterance.

In this case, the portable device 100 or 400 may determine a microphone relatively further away from the user than the other by comparing a phase difference between the audio signals received through the first and second microphones or the amplitudes of the audio signals. Further, the portable device 100 or 400 may also determine a microphone relatively further away from the user than the other based on whether each microphone signal is saturated or comparison between the MFCC properties.

The portable device 100 or 400 may transmit the processed audio signals to the external device 20 (S640).

Figure 7:
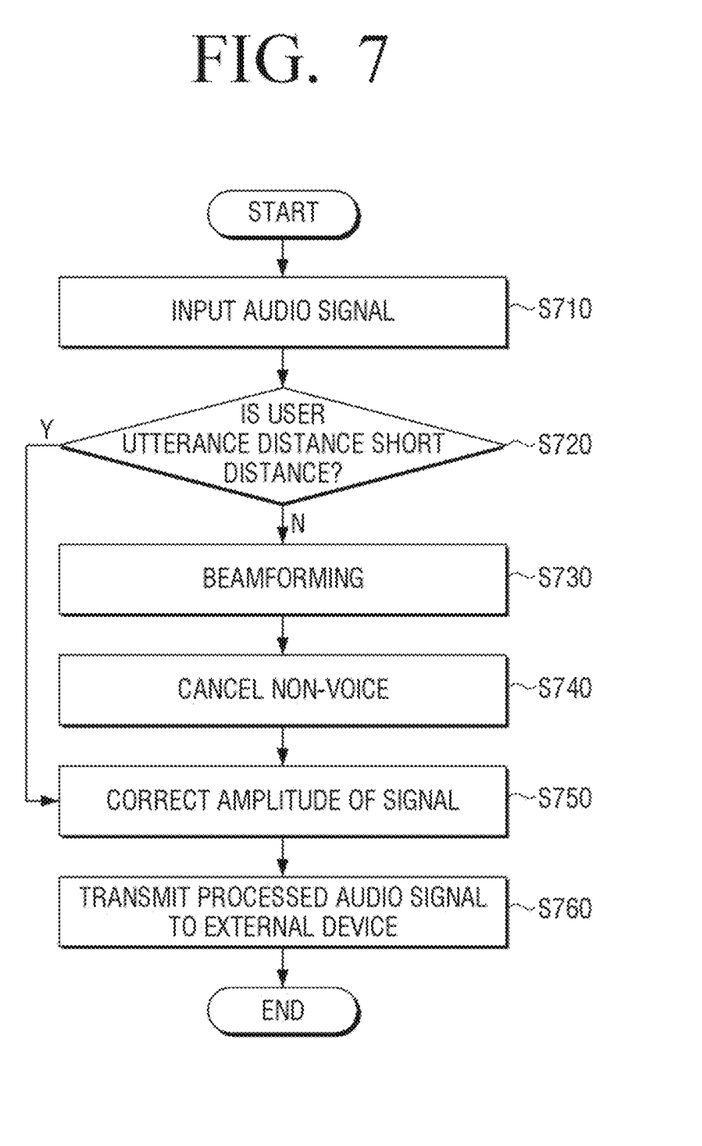
FIG. 7 is a flow chart illustrating the audio signal processing method for the portable device according to the embodiment of the disclosure in detail.

FIG. 7 is a flow chart illustrating the audio signal processing method for the portable device 100 or 400 according to the embodiment of the disclosure in detail.

Referring to FIG. 7, when audio signals are received through the first and second microphones (S710), the portable device 100 or 400 may determine a user utterance distance as described above (S720).

Accordingly, when it is determined that the user utterance distance is the short distance utterance (Y in S720), the portable device 100 or 400 may perform only signal amplitude correction for a mono audio signal received through one of the first and second microphones disposed relatively further away from the user than the other (S750), and the portable device 100 or 400 may transmit the processed audio signal to the external device (S760). In this case, an amplitude of the audio signal received through another microphone is not corrected, and the audio signal received through another microphone is not transmitted to the external device 20.

When it is determined that the user utterance distance is not the short distance utterance (N in S720), the portable device 100 or 400 performs beamforming for stereo audio signals received through the first and second microphones (S730).

In detail, the portable device 100 or 400 may perform beamforming in the user detection by using a phase difference between the audio signals received through the first and second microphones. Therefore, an audio signal (that is, a side surface signal) input through the microphones from a direction deviating from the user direction at a predetermined angle is canceled or attenuated, and a mono audio signal obtained as a result of the beamforming may be provided for the non-voice canceling processing.

The portable device 100 or 400 may cancel a non-voice from the mono audio signal obtained by the beamforming (S740). In this case, the portable device 100 or 400 may cancel the non-voice signal by using the voice/non-voice distinguishing module.

Then, the portable device 100 or 400 may perform the signal amplitude correction processing by applying a gain curve to the mono audio signal obtained after the non-voice canceling processing (S750) and transmit the processed audio signals to the external device 20 (S760).

According to the various embodiments of the disclosure as described above, the portable device for controlling an external device may flexibly process an audio signal depending on an utterance distance of a user. Accordingly, the external device may perform smooth voice recognition regardless of the utterance distance of the user.

Meanwhile, operations of the processor 140 or 440 of the portable device 100 or 400 for controlling the external device 20 or the audio signal processing methods for the portable device 100 or 400 according the various embodiments described above may be produced as software and installed in the portable device 100 or 400.

For example, a non-transitory computer readable medium in which a program for performing an audio signal processing method is stored may be installed, the audio signal processing method including: receiving audio signals including a user voice uttered by a user through a first microphone disposed in one surface of the portable device 100 or 400 and a second microphone disposed on the other surface opposite to one surface of the portable device;

determining a user utterance distance between the potable device and the user; processing the received audio signals; and transmitting the processed audio signals to an external device, in which in the processing of the audio signals, when it is determined that the user utterance distance is the short distance utterance, only the audio signal received through one of the first and second microphones disposed relatively further away from the user than the other is processed.

Here, the non-transitory computer readable medium is not a medium that stores data therein for a while, such as a register, a cache, a memory, or the like, but means a medium that semi-permanently stores data therein and is readable by a device. In detail, the various middleware or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

The spirit of the disclosure has been illustratively described hereinabove. It will be appreciated by those skilled in the art that various modifications and alterations may be made without departing from the essential characteristics of the disclosure. In addition, the embodiments disclosed in the disclosure are not to limit the disclosure, but are to describe the spirit of the disclosure. The scope of the disclosure is not limited only to the embodiments. Therefore, the scope of the disclosure should be interpreted by the following claims, and it should be interpreted that all the spirits equivalent to the following claims fall within the scope of the disclosure.

The invention claimed is:

1. A portable device for controlling an external device, the portable device comprising:
   a first microphone configured to be disposed in one surface of the portable device and configured to receive an audio signal including a user voice input;
   a second microphone configured to be disposed on an other surface opposite to the one surface of the portable device and configured to receive the audio signal including the user voice input;
   a communication unit configured to communicate with the external device; and
   a processor configured to:
      identify whether a user utterance is a short distance utterance between the portable device and the user based on the audio signals received through the first and second microphones,
      based on amplitudes of the audio signals received through the first and second microphones being larger than a preset threshold value, identify that the user utterance is the short distance utterance,
      based on the user utterance being the short distance utterance, perform a function corresponding to a processing for the audio signal received through one of the first and second microphones disposed relatively further away from the user than the other without performing the function corresponding to the processing for the audio signal received through the other microphone, and control the communication unit to transmit the processed audio signal to the external device, and
      based on the user utterance not being the short distance utterance, perform beamforming based on both of the audio signal received through the first microphone and the audio signal received through the second microphone.

2. The portable device as claimed in claim 1, further comprising:
   a signal processing unit,
      wherein the processor is configured to control the signal processing unit to perform the processing for the audio signal, and
      wherein the signal processing unit is configured to perform at least one signal processing of noise canceling or amplitude correction for the audio signals received through the first and second microphones.

3. The portable device as claimed in claim 2, wherein the processor is configured to control the signal processing unit to perform only the amplitude correction for the audio signal received though the microphone disposed relatively further away from the other when it is identified that the user utterance is the short distance utterance.

4. The portable device as claimed in claim 2, wherein the processor is configured to control the signal processing unit to perform the noise canceling and the amplitude correction for the audio signals received though the first and second microphones when it is identified that the user utterance is not the short distance utterance, and control the communication unit to transmit the processed audio signals to the external device.

5. The portable device as claimed in claim 1, wherein the processor is configured to identify the user utterance based on whether a breathing sound of the user is detected from the audio signals received through the first and second microphones.

6. The portable device as claimed in claim 5, wherein the processor is configured to compare a mel-frequency cepstral coefficient (MFCC) property of the audio signals received through the first and second microphones and an MFCC property of a preset breathing sound template with each other and identify that the user utterance is the short distance utterance when similarity between the MFCC properties is a preset threshold similarity value or more.

7. The portable device as claimed in claim 1, wherein the processor configured to identify that the user utterance is the short distance utterance when a difference between an amplitude of the audio signal received through the first microphone and an amplitude of the audio signal received through the second microphone is a preset threshold difference value or more.

8. The portable device as claimed in claim 1, wherein the processor is further configured to, based on the user utterance being the short distance utterance, perform the function corresponding to the processing for the audio signal received through the microphone disposed relatively further away from the user than the other without performing any beamforming for the audio signal received through the microphone disposed relatively further away from the user.

9. An audio signal processing method for a portable device for controlling an external device, the audio signal processing method comprising:
   receiving audio signals including a user voice input through a first microphone disposed in one surface of the portable device and a second microphone disposed on an other surface opposite to the one surface of the portable device;
   identifying whether a user utterance is a short distance utterance between the portable device and the user; processing the received audio signals, wherein in the identifying, it is identified that the user utterance is the short distance utterance based on amplitudes of the audio signals received through the first and second microphones being a preset threshold value or more; and transmitting the processed audio signals to the external device, wherein the processing comprises:

based on the user utterance being the short distance utterance, performing an audio processing for the audio signal received through one of the first and second microphones disposed relatively further away from the user than the other without performing the audio processing for the audio signal received through the other microphone, and based on the user utterance not being the short distance utterance, performing beamforming based on both of the audio signal received through the first microphone and the audio signal received through the second microphone.

10. The audio signal processing method as claimed in claim 9, wherein in the processing of the received audio signals, at least one signal processing of noise canceling or amplitude correction for the audio signals received through the first and second microphones is performed.

11. The audio signal processing method as claimed in claim 10, wherein in the processing of the received audio signals, only the amplitude correction is performed for the audio signal received though the microphone disposed relatively further away from the other when it is identified that the user utterance is the short distance utterance.

12. The audio signal processing method as claimed in claim 10, wherein in the processing of the received audio signals, the noise canceling and the amplitude correction are performed for the audio signals received though the first and second microphones when it is identified that the user utterance is not the short distance utterance.

13. The audio signal processing method as claimed in claim 9, wherein the identifying includes: detecting a breathing sound of the user from the audio signals received through the first and second microphones; and identifying the user utterance depending on whether the breathing sound is detected.

14. The audio signal processing method as claimed in claim 13, wherein the detecting of the breathing sound includes comparing an MFCC property of the audio signals received through the first and second microphones and an MFCC property of a preset breathing sound template with each other to identify similarity between the MFCC properties, and the identifying of the user utterance includes identifying that the user utterance is the short distance utterance when the similarity is a preset threshold similarity value or more.

* * * * *